United States Patent
Wang

(10) Patent No.: US 8,140,751 B1
(45) Date of Patent: Mar. 20, 2012

(54) POWER-AWARE REDUNDANT ARRAY OF INDEPENDENT DISKS (PARAID) AND RELATED METHODS

(75) Inventor: An-I Andy Wang, Tallahassee, FL (US)

(73) Assignee: Florida State University, Tallahassee, FL (US)

( * ) Notice: Subject to any disclaimer, the term of this patent is extended or adjusted under 35 U.S.C. 154(b) by 243 days.

(21) Appl. No.: 11/424,656

(22) Filed: Jun. 16, 2006

Related U.S. Application Data

(60) Provisional application No. 60/691,348, filed on Jun. 17, 2005.

(51) Int. Cl.
*G06F 12/00* (2006.01)

(52) U.S. Cl. ........ 711/114; 711/154; 711/170; 713/300; 713/320; 713/324; 714/6.22

(58) Field of Classification Search .................. 711/114, 711/154, 170; 714/6.22; 713/300, 320, 324
See application file for complete search history.

(56) References Cited

U.S. PATENT DOCUMENTS

| | | | |
|---|---|---|---|
| 5,913,215 A * | 6/1999 | Rubinstein et al. | 707/10 |
| 7,210,005 B2 * | 4/2007 | Guha et al. | 711/114 |
| 7,426,655 B2 * | 9/2008 | Shaik et al. | 714/6 |
| 2007/0143542 A1 * | 6/2007 | Watanabe et al. | 711/114 |

OTHER PUBLICATIONS

Charles Weddle, Mathew Oldham, An-I A. Wang, RuGang Xu, Peter Reiher, Geoffrey H. Kuenning. "PARAID: The Gear-Shifting Power-Aware RAID". Powerpoint presentation from the 2005 USENIX Annual Technical Conference, Anaheim, Apr. 2005. retrieved from http://www.charlesweddle.com/s-pd/ on Oct. 1, 2008.*
Charles Weddle, Mathew Oldham, An-I A. Wang, RuGang Xu, Peter Reiher, Geoffrey H. Kuenning. "PARAID: The Gear-Shifting Power-Aware RAID". Poster from the 2005 USENIX Annual Technical Conference, Anaheim, Apr. 2005. retrieved from http://www.charlesweddle.com/s-pd/ on Oct. 1, 2008.*

* cited by examiner

*Primary Examiner* — Matthew Bradley
(74) *Attorney, Agent, or Firm* — Novak Druce + Quigg LLP

(57) ABSTRACT

A system defining a power-aware redundant array of identical disks (PARAID) is provided. The PARAID includes multiple data-storing disks that store multiple data blocks in a skewed stripping pattern. The PARAID further includes a PARAID disk manager for selectively powering on the plurality of disks based upon user demand. A PARAID disk driver is also provided. The PARAID disk driver includes a PARAID level module for instantiating a PARAID to operate within a computing environment by segmenting data among the array of independent disks in a skewed striping pattern. The skewed striping pattern creates multiple distinct sets of the array of independent disks, each set defining a unique gear in which the PARAID can operate. Additionally, the PARAID disk driver includes a PARAID gear-shifting logic module for selectively causing the PARAID to operate in a particular gear. The PARAID disk driver further includes a PARAID monitoring module for determining in which gear the PARAID operates.

18 Claims, 10 Drawing Sheets

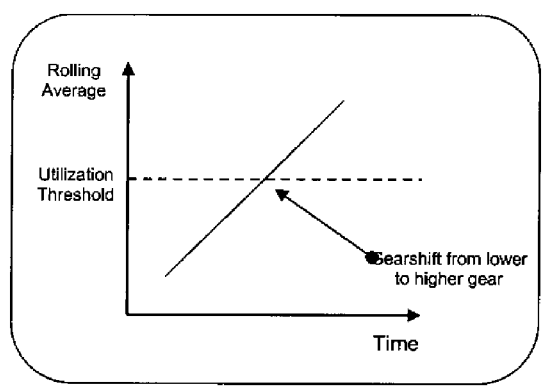
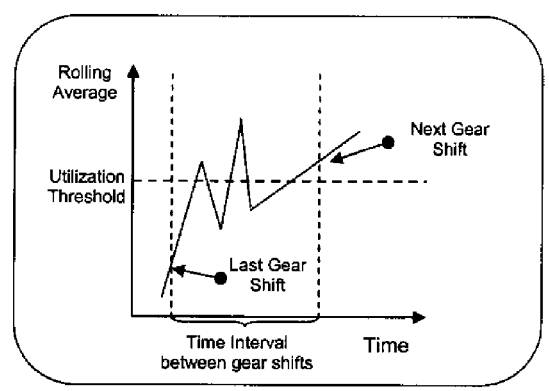
FIG. 9  FIG. 10

POWER-AWARE REDUNDANT ARRAY OF INDEPENDENT DISKS (PARAID) AND RELATED METHODS

CROSS-REFERENCE TO RELATED APPLICATION

This application claims the priority of U.S. Provisional Patent Application No. 60/691,348, which was filed Jun. 17, 2005, and which is incorporated in its entirety herein.

STATEMENT REGARDING FEDERALLY SPONSORED RESEARCH OR DEVELOPMENT

The U.S. government may have certain rights to the invention by virtue of support provided under National Science Foundation (NSF) Grant No. CNS-0410896.

FIELD OF THE INVENTION

The present invention is related to the field of computing devices, and, more particularly, to disks used for data storage in computing devices.

BACKGROUND OF THE INVENTION

A Redundant Array of Independent, or Inexpensive, Disks (RAID) is a collection of two or more storage disks for storing machine readable data. Typically, the disks operatively function under the control of a controller that manages the processes relating to information storage and retrieval on the disks.

In a conventional computing environment, an RAID is utilized for the sharing or replicating of data among multiple disk drives. The RAID provides a mechanism for storing the same data in different places—that is, redundantly—on multiple hard disks. The arrangement is intended to place data on multiple disks, such that input/output operations can overlap one another in a balanced way, thereby improving performance. Moreover, because multiple disks increase the mean-time-between-failure (MTBF), storing data redundantly increases fault-tolerance. Accordingly, the benefits often associated with the RAID include enhanced data integrity, fault-tolerance and/or performance relative to computing device that use a single disk drive. An initial impetus for the RAID was to combine multiple low-cost devices using older technology so as to achieve such advantages.

Notwithstanding these acknowledged advantages afforded by the RAID, some limitations remain with respect to the power consumption of such a device. Newer systems and devices that utilize the RAID—including not just laptop computers, for example, but other devices such as data communication network servers—tend to consume more power in effecting input-output (I/O) operations.

Energy consumption of disk drives used in web servers, for example, accounts for as much as 24% of the servers' total power usage. In proxy servers, that energy consumption can be as high as 77% of the total usage. As newer, more sophisticated devices evolve, the concern over energy costs associated with disk drives is likely to intensify. Thus, there is a need in the art for a way to reduce the amount of power consumed by a conventional RAID without degrading performance or sacrificing the reliability that was an original objective of such a device.

SUMMARY OF THE INVENTION

The invention provides a power-aware redundant array of independent disks (PARAID) and related methods for reducing power consumption in a computing system without degrading the performance or reliability of the system.

According to one embodiment of the invention, a system defining a PARAID can include a plurality of disks that each store a plurality of data blocks in a skewed striping pattern. The PARAID also can include a PARAID disk manager for selectively powering on the plurality of disks based upon user demand.

Another embodiment of the invention is a PARAID disk driver that includes a PARAID level module for instantiating a PARAID to operate within a computing environment by segmenting data among the array of independent disks in a skewed striping pattern. The skewed striping pattern creates multiple distinct sets of the array of independent disks, each set defining a unique gear in which the PARAID can operate. Additionally, the PARAID disk driver can include a PARAID gear-shifting logic module that selectively causes the PARAID to operate in a particular gear. The PARAID disk driver further can include a PARAID monitoring module for determining in which gear the PARAID operates.

Yet another embodiment of the invention is a method of instantiating and operating a power-aware redundant array of identical disks (PARAID). The method can include storing a plurality of data blocks in a skewed striping pattern on various disks belonging to the array of identical disks. The method further can include selectively powering on the plurality of disks based upon user demand.

Still another embodiment of the invention is a computer-readable storage medium that includes computer instructions for instantiating and operating a PARAID. The instructions can include instructions for storing a plurality of data blocks in a skewed striping pattern on various disks belonging to the array of identical disks and selectively powering on the plurality of disks based upon user demand.

BRIEF DESCRIPTION OF THE DRAWINGS

There are shown in the drawings, embodiments which are presently preferred, it being understood, however, that the invention is not limited to the precise arrangements and instrumentalities shown.

FIG. 9 is a plot of load-versus-time illustrating a gear shift from a low gear of two disks to a high gear of four disks because the moving utilization average rose above the threshold, according to still another embodiment of the invention.

FIG. 10 is a plot of load-versus-time illustrating the response of a power-aware redundant array of identical disks (PARAID) to fluctuating workload with sharp increases by performing multiple upward gear shifts in a short period of time, according to yet another embodiment of the invention.

DETAILED DESCRIPTION OF THE INVENTION

One aspect of the invention is a multiple-disk driver for a power-aware redundant array of independent disks (PARAID), the multiple-disk driver defining a PARAID disk driver as described herein. The PARAID disk driver implements a unique striping strategy referred to as skewed striping. Striping generally refers to splitting up data such that the data can be stored on multiple disk drives so that the stored data can be accessed in parallel. Skewed striping according to the present invention, however, places data blocks on an array of disks in such a manner that the number of powered-on disks can vary according to system-user demands; that is, according to which elements of stored data are accessed and how often. More particularly, data blocks are placed in a skewed fashion such that disks in the array are functionally equivalent to different sets of disks. An array of four disks, for example, can be thought of as comprising two different sets of disks. The elements of the first set might be the first two disks in the array, and the elements of the second set be all four disks in the array. Accordingly, with a skewed striped pattern, data blocks on the PARAID device can be found in either the two-disk set or the four disk set.

The PARAID disk drive uses the skewed striping pattern to place data blocks on the array of disks such that the number of powered-on disks can vary according to user demand. The effect is typically a reduction in power consumed in effecting input/output (I/O) operations, the reduction being achieved without degrading performance quality or reliability The PARAID disk driver, as explained herein, can comprise machine-readable code configured to run on a general-purpose computer or, alternatively, on an application-specific computer such as a web server or a proxy server. Alternatively, the PARAID disk driver can comprise dedicated hardwired circuitry. In still another embodiment, the PARAID disk driver can comprise a combination of machine-readable code and hardwired circuitry.

Conventionally, a disk driver typically refers to a software-implemented set of operations, whereas a disk controller refers to a hardware-implemented device for effecting the same or similar operations. As used herein, however, a disk in the context of a PARAID disk driver denotes a driver implemented in either machine-readable code or dedicated hardwired circuitry, as well as one implemented in a combination of machine-readable code and dedicated circuitry.

Figure 1:
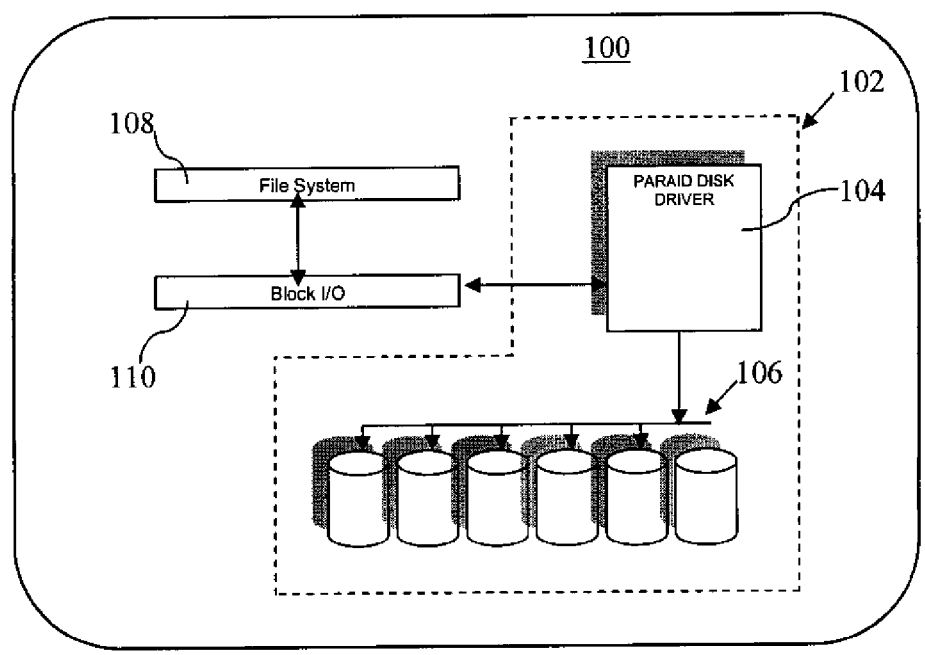
FIG. 1 is a schematic diagram of a power-aware redundant array of identical disks (PARAID), according to one embodiment of the invention.

FIG. 1 is a schematic diagram of a computing environment 100 in which a PARAID 102 according to one embodiment of the invention can be utilized. The PARAID 102 illustratively comprises an array of disk devices 106 and a PARAID disk driver 104 for selectively powering on and powering off different combinations of the disk devices based on user demand. Illustratively, the PARAID 102 is implemented as a set of machine-readable instructions. In alternative embodiments, however, the PARAID is implemented in dedicated hardwired circuitry configured to perform the operations described herein or in a combination of machine-readable instructions and hardwired circuitry.

Taken jointly, therefore, the PARAID disk driver 104 and the array of disk devices 106 that are powered on and off according to user demand by the PARAID disk driver together define the power-aware redundant array of independent disks, the PARAID 102. The computing environment 100 in which the PARAID 102 is illustratively incorporated can comprise a single, stand-alone computing device, such as a general-purpose computer or an application-specific computer. The computing environment 100 alternately can comprise one or more general-purpose or application-specific networked computers, such as a web server or proxy server.

Figure 2:
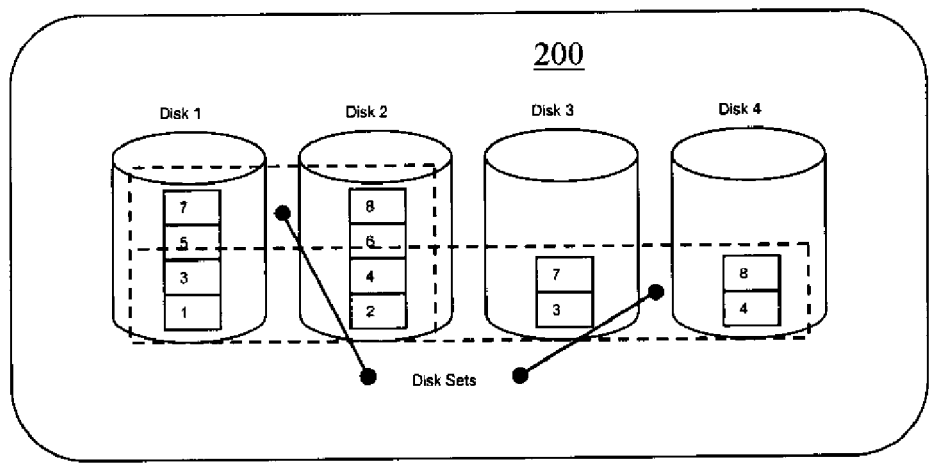
FIG. 2 is a schematic diagram of a skewed striping pattern used in a power-aware redundant array of identical disks (PARAID), according to another embodiment of the invention.

Prior to describing detailed features of a particular embodiment of the PARAID disk driver 104, the operative features of the PARAID 102 are described. Referring additionally to FIG. 2, an example of a particular skewed striping pattern used by the PARAID 102 is schematically shown. In accordance with this particular skewed striping pattern, data blocks 1 through 8 are stored on a four-disk array 200 comprising Disks 1 through 4. As already noted, according to the skewed striping pattern of the invention, the respective disks correspond to multiple, unique sets. In this example, the four-disk array 200 has two different sets of disks, namely, a two-disk set and a four-disk set. Notice that some of the data blocks are written to the array of disks more than once. Disk 1 has a copy of data blocks 3 and 7 while Disk 3 also has a copy of data blocks three and seven. This is consistent with the skewed striping pattern, wherein some data blocks are replicated so that the different sets of disks can be created from the same array of disks. Notice also that not all blocks are replicated on all sets of disks.

Data blocks 5 and 6 are stored on Disks 1 and 2, but not on Disks 3 and 4. Note that, as discussed more particularly below, within each set of disks, a uniform striping pattern can be used similar to a RAID level 0 so that disk performance can be at or near a maximal performance level. Treating different combinations of disk devices as different sets, allows for different modes of operation. If a device is operating on the first set of disks then Disks 3 and 4 are not needed; they can be powered off, which reduces power consumption.

The "gears" of the PARAID alluded to above are the different sets of disks in the array; that is the PARAID operates as though or treats the different sets as gears. The gears represent different modes of operation for the PARAID. Each gear in the PARAID can serve the same I/O request.

Figure 3:
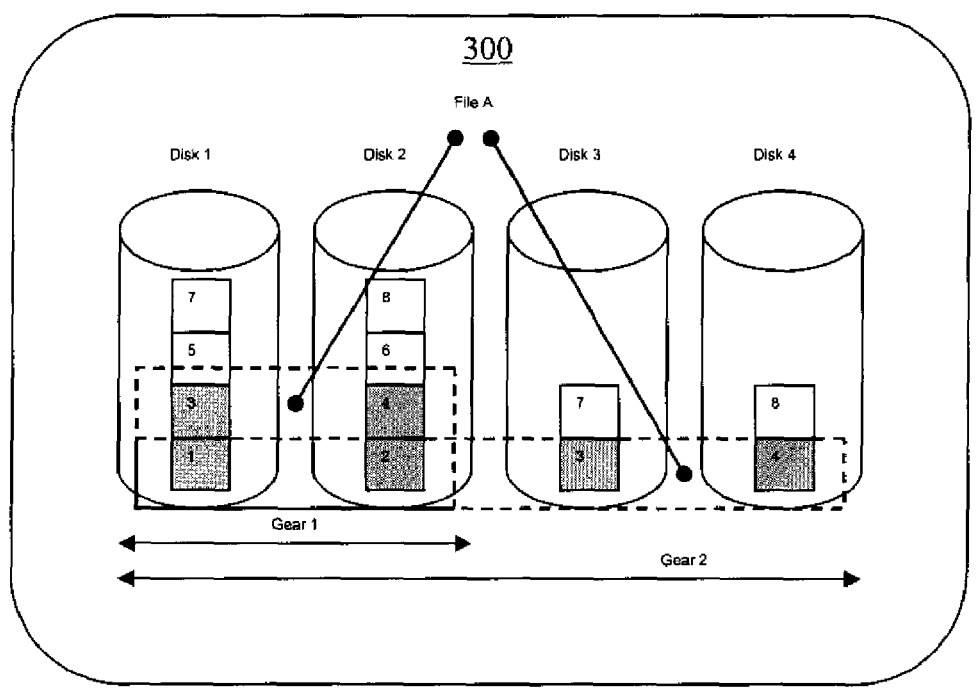
FIG. 3 is a schematic diagram of a skewed striping pattern used in a power-aware redundant array of identical disks (PARAID), according to yet another embodiment of the invention.

Referring now to FIG. 3, the reading of a four-block file in a PARAID is illustrated. The four-block file comprising blocks either gear one, made up of two disks, or gear two, that is made up of four disks. Notice that blocks 1 through 4 are available from either gear one (defined by the set comprising Disks 1 and 2) or gear two (defined by the set comprising Disks 1 through 4) because of the way the skewed striping pattern places the blocks on the respective disks.

Power Savings Achieved with Skewed Striping

The PARAID 102 defined by the PARAID disk driver 104 and the array of disk devices 106, accordingly, comprises different gears. According to one embodiment of the invention, the PARAID disk driver 104 causes the PARAID 102 to operate in the gear that meets the demands imposed on the PARAID while keeping the largest number of disk devices powered down. Functionally, this corresponds to extending disk parallelism toward a maximum while tending to minimize the number of powered-on disks. The relationship between disk parallelism and the number of powered-on disks represents the relationship between performance and saving power. Maximizing disk parallelism achieves maximum performance while saving the least amount of power. Minimizing the number of powered-on disks saves the most amount of power but likely achieves the less robust performance.

Because the PARAID disk driver 104 can vary the number of powered-on disks, the PARAID 102 can step up the number of powered-on disks to match a particular workload. A conventional RAID cannot do this; the number of powered-on disks is constant for a conventional RAID. By contrast, however, the PARAID 102 has the capability for more closely approximating a workload line. How close the PARAID 102 can approximate this line depends on how many gears are provided by the PARAID. The closer to the workload line the more power that can be saved by the PARAID 102.

If PARAID 102 is operating under a light load, it is not necessary to serve the requests using all the disks in the array of disk drives 106. The same level of performance can be achieved with two disks under light system load as compared to the performance of four disks. These periods of light load are opportunities to power off one or more disks, thereby saving power accordingly.

As explained more particularly below, the PARAID 102 will shift into different gears according to the system load. In the present context, gear shifting by the PARAID 102 refers to a switching from one gear to another gear, each different gear corresponding to a different set of disks. Accordingly, gear shifting by the PARAID can be considered equivalent to changing the view into the array of disks from one set of disks to another set of disks. As the system experiences higher load, the PARAID 102 will shift into higher gears so that higher performance demands can be met. While under light loads, the PARAID 102 will shift into lower gears so that power can be saved.

Figure 4:
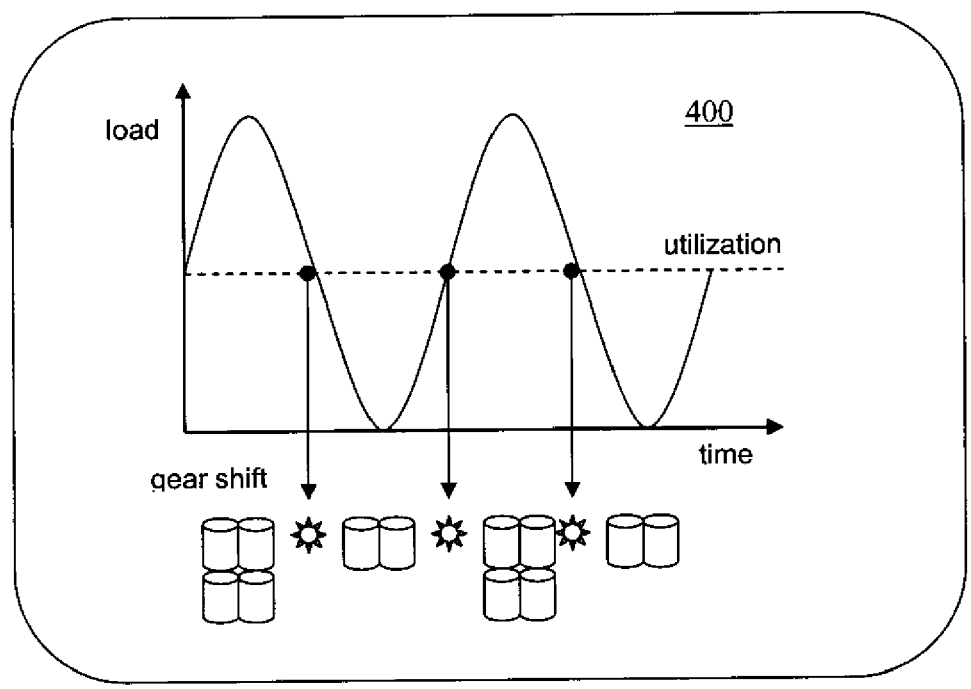
FIG. 4 is a combined time-versus-load plot and schematic illustrating a mechanism by which a power-aware redundant array of identical disks (PARAID) shifts gears in order to meet a demand on its scarce resource, according to another embodiment of the invention.

FIG. 4 shows how a PARAID will gear shift to meet the performance demand. As the load fluctuates, the PARAID 102 adapts to the changes by shifting gears. As explained more particularly below, the PARAID 102 determines when to gear shift based on the disk utilization for the disks within the gear. That is, if the disks are under utilized, then the PARAID 102 will shift into a lower gear. If the disks are over utilized, then the PARAID 102 will shift into a higher gear.

Preserving Peak Performance

In order to avoid undue degradation in throughput due to fewer disk devices used in lower gears, the PARAID 102 must maximize or otherwise enhance disk parallelism. As noted previously, the PARAID 102 has the ability to power on the appropriate number of disks according to system load. To be able to take advantage of the disks that are powered on and also serve the I/O requests rapidly, the data blocks within the gear are load balanced on the disks using a uniform striping pattern. Load balancing prevents single disk from becoming a bottleneck slowing down the parallel operation of the other disks.

The PARAID 102 uses a uniform striping pattern within each gear in order to avoid or mitigate throughput degradation. Accordingly, in the context of the exemplary four-disk array, the PARAID 102, when operating in a gear that utilizes all four disks, will achieve the same performance as a conventional RAID device using four disks.

Compared to a conventional RAID device of the same size, the PARAID 102 has the potential to more efficiently read in small files when operating in a low gear; that is, when operating in a gear comprising relatively fewer disks. This is due to the latency associated with reading from a disk. Disk latency is a factor of seek time and rotational latency. The average latency for the RAID is bounded by the latency of the slowest drive. When the number of disks is reduced in an array, it is more probable that the average latency will also be reduced. Therefore, on average the latency associated with reading small files is less with the PARAID 102 operating in a low gear (i.e., using fewer disks) as compared to a conventional RAID device. This property of the PARAID 102 is also true for larger files but the benefits are somewhat mitigated by the throughput loss of transferring a large file as compared to that for a small file.

Compared to a same size conventional RAID device, the PARAID 102 has the potential to degrade throughput for large files when operating in a low gear. Several blocks of data can be read in from several disks working in parallel faster than several blocks of data read from one disk. When the number of disks is reduced, the throughput is reduced because there are fewer disks reading in the data in parallel. Therefore, the throughput associated with reading in large files is degraded for the PARAID 102 operating in a low gear (i.e., using fewer disks) as compared to a conventional RAID device. Although, it is probable that reading large files will be reflected as an increase in workload. This increase in workload will cause the PARAID 102 to perform a gear shift into a higher gear, thus increasing disk parallelism. By increasing disk parallelism, the throughput associated with reading large files is no longer an issue. Fortunately, most of the files written and read from storage devices are small files, making this even less of a concern for most workloads.

Maintaining Reliability

The PARAID 102 is able to tolerate disk failure, thereby maintaining a level of reliability that equal to or comparable with the level of reliability provided by conventional RAID. In addition to tolerating disk failure, the PARAID 102 introduces another aspect of reliability in that the PARAID 102 frequently powers on disks and, similarly, powers off disks frequently in order to save power. This power cycling a disk can have an adverse affect on the mean time-to-failure for the disk. Indeed, disks typically have an expected number of times that they can be power cycled before failure. Every time a disk is powered on and off, it nears its eventual failure. An additional feature of the PARAID 102, therefore, is mechanism to accommodate this adverse affect of power cycling on the disks. As explained more particularly below, the PARAID 102 monitors how often each drive is power cycled and reconfigures the different gears (i.e., the corresponding sets of disks) in order to intermittently substitute disks that have been less frequently cycled for one that have been more frequently cycled.

More particularly, according to one embodiment, the PARAID 102 manages the power cycling of the disks in the array of disk devices 104 by creating a bimodal distribution of busy disks and idle disks. The busier disks stay powered on and the more idle disks often stay powered off. By creating a bimodal distribution of disks, this creates a set of middle-range disks that are power cycled more often. PARAID can manage the power cycles for each disk by switching the position of the disks in the array according to the number of power cycles incurred for each disk.

Figure 5:
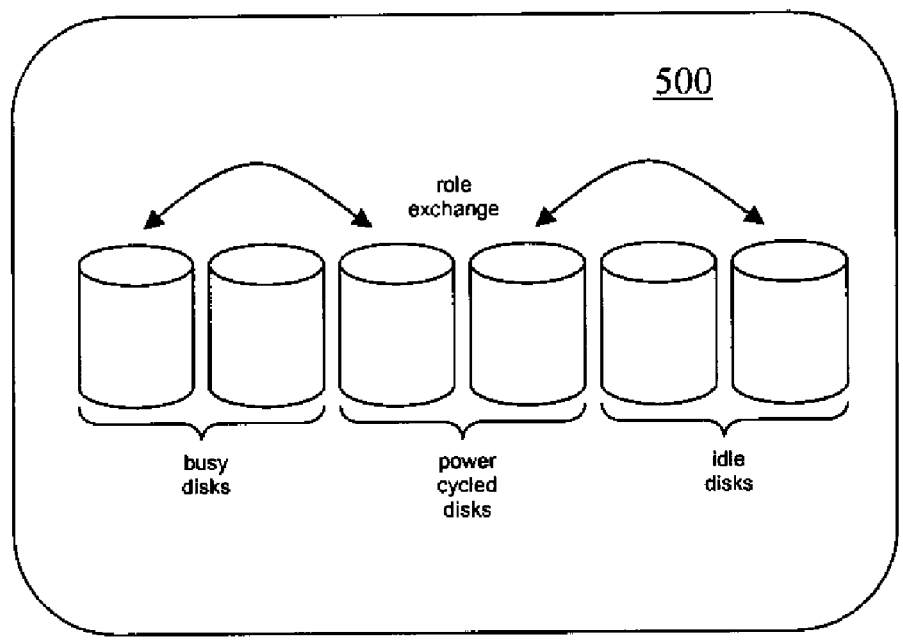
FIG. 5 is a schematic diagram illustrating the mechanism by which a power-aware redundant array of identical disks (PARAID) manages the power cycling of the disks in an array of disk devices by creating a bimodal distribution of busy-to-idle disks, according to yet another embodiment of the invention.

An example of this is illustrated in FIG. 5 in which the PARAID uses an array 500 comprising six disks and three gears. As shown, the first gear comprises disks one and two, the second gear comprises disks one, two, three, and four, and the last gear comprises all six disk, each gear again corresponding to a distinct set of disks. Given the gear layout as described, disks one and two are the busier disks and disks five and six are the more idle disks. Accordingly, disks three and four are the disks that are be power cycled more frequently. The PARAID can be configured to keep a count of the number of power cycles performed on each disk and to determine which disks should exchange roles. After the middle disks have reached a certain power cycle threshold relative to other disks, they can be role exchanged with the busy or idle disks so that each disk in the array moves to the rated number of power cycles at a constant rate, helping to manage the reliability of the PARAID device.

PARAID Disk Driver: Logical Design

Figure 6:
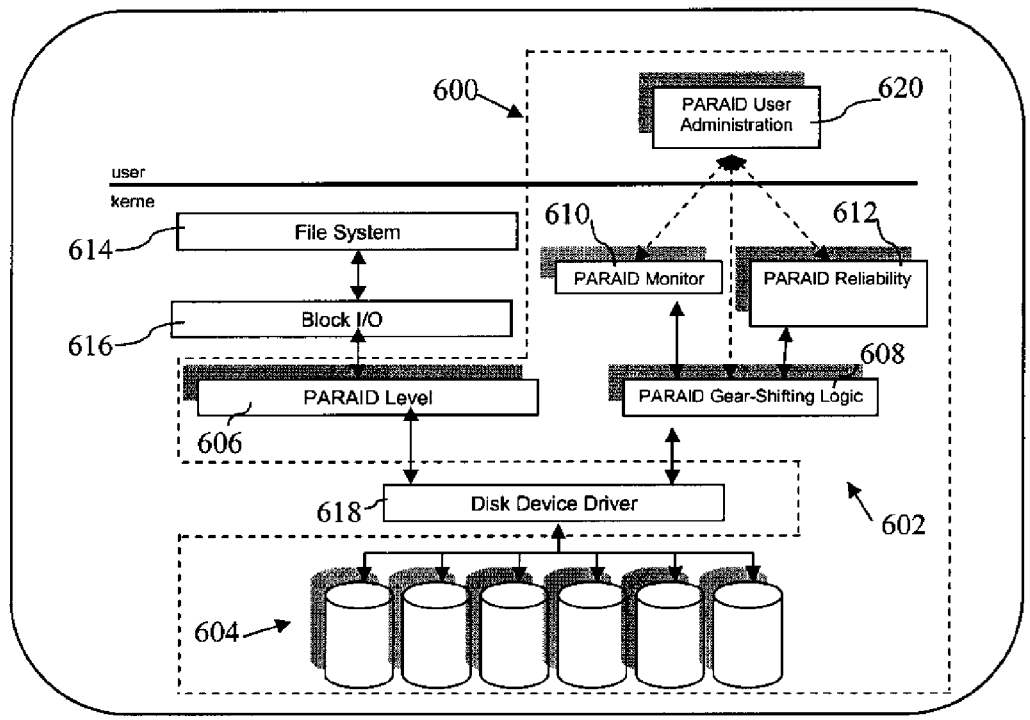
FIG. 6 is a schematic diagram of a logical design of a power-aware redundant array of identical disks (PARAID) disk driver, according to still another embodiment of the invention.

Referring now to FIG. 6, a logical design of a PARAID disk driver according one embodiment is illustrated. A PARAID 600 is defined by the PARAID disk driver 602 and a corresponding array of disks 604. The PARAID disk driver 602 illustratively includes a PARAID level module 606, which effects the creation or instantiation of the PARAID 600. The PARAID disk driver 602 also illustratively includes a PARAID gear-shifting logic module 608, the functions of which include selectively power cycling each of the disks of an array of disk devices 604, as explained herein, and synchronizing the array of disk devices. Illustratively, the PARAID disk driver 602 further includes a PARAID monitoring module 610 that is communicatively linked to the PARAID gear-shifting logic module 608 and that determines when the "gears" of the PARAID 600 should be "shifted" based on current demand on the resources of the array of disk devices 604. The PARAID disk driver 602 also illustratively includes a PARAID reliability module 612 that is communicatively linked to the PARAID gear-shifting logic module 608. The PARAID reliability module 612 manages a life expectancy of each disk device belonging to the array of disk devices 604 and handles discrete disk device failures.

The PARAID level module 606 and the PARAID gear-shifting logic module 608, as illustrated are communicatively linked to a disk device driver 618, which is connected to the array of disk devices 604. In general, the disk device driver masks and handles vendor-specific hardware characteristics. It is to be noted, however, that the logical design of the PARAID 600 is not sensitive to the specifics of hard drives of particular vendors. In alternative embodiments, at least one of the PARAID level module 606 and the PARAID gear-shifting logic module 608 are communicatively linked directly to the array of disk 604.

As described herein, the PARAID level module 606 instantiates the PARAID 600, manages its current state, and handles block I/O requests. Illustratively, when the PARAID 600 is first instantiated, the PARAID level module 606 is active. The PARAID level module 606 determines a size for the PARAID 600, creating the data structures needed to maintain its current state and a RAID super-block. To achieve this result, the PARAID level module 606 determines which disks to include as part of the composition of the PARAID 600, as well as the number of gears that the PARAID 600 uses (i.e., the different sets of disks). Some or all of the pertinent parameters can be set by a system administrator and can be passed into the PARAID level module 606 by a configuration file or user-supplied command line arguments. Based on the determination of the number of disks to be included and the number of gears to be created, the PARAID level module 606 calculates the size of the PARAID. The PARAID 600 capacity can be calculated with the algorithm listed in TABLE.1. The algorithm assumes that the disk sizes of the disks in the array are the same.

TABLE 1

PARAID capacity algorithm

PARAID Capacity Algorithm

1. Let c be equal to the total storage capacity of the first gear in disk blocks.
2. Compute the storage space required on one disk for each gear except the first gear using c.
3. Sum the total storage requirements for all of the gears other than the first gear.
4. If the sum for any disk is greater than the total size of one disk, then subtract 1 disk block size from c and go back to step 2. If the sum is less than the total size of one disk, then c represents the total capacity of the PARAID device.

The number of disks in the first gear and the size of each disk determine the size of the PARAID 600. Once the capacity of the PARAID 600 is determined, the boundary of each gear on each disk that is not in the first gear is calculated. Boundaries on each disk for each gear are determined such that when writing data to a disk for a particular gear, an offset can be applied to the sector of the data block to be read or written. The boundary on a disk for any gear is calculated by summing the storage space used by all of the other gears on that disk below the gear. For example, if the PARAID 600 has three gears and four disks, for example, the boundary for gear three on disk three is calculated by determining the storage space used for gear two on disk three; the result is the boundary for gear three on disk three.

Figure 7:
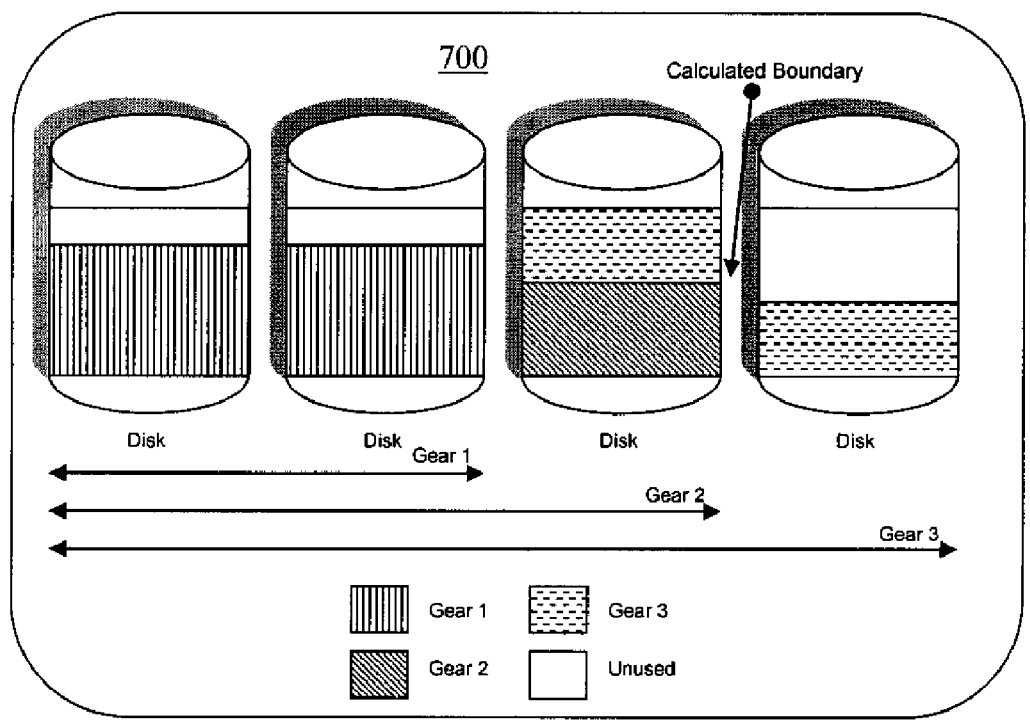
FIG. 7 is a schematic diagram of the placement of data blocks on disks by skewed striping, according to still another embodiment of the invention.

FIG. 7 provides a schematic illustration of the operation of the capacity algorithm in determining a total capacity for the PARAID 600 taking into account the disks and gears. The total capacity for the PARAID 600, as shown, is the storage space on disks one and two that make up the first gear. It is to be noted that there is some unused space on disks one and two. This is due to the PARAID level module 606 reducing the total capacity of the PARAID device so that replicated data blocks for each of the gears can fit on the disks that are not in gear one.

Once the size of the PARAID 600 has been determined, the necessary data structures used to maintain the current state of the PARAID are created and initialized by the PARAID level module 606. Each component maintains information about the PARAID 600 and its operation. This information is delineated below as part of the description of each component.

Additionally, the PARAID level module 606 creates and persists the PARAID super block alluded to above. The super block is illustratively 512 bytes or one sector. It is written to the first sector of each disk in the PARAID 600. By persisting the super block, the PARAID 600 can be stopped and started without having to be instantiated anew each time. Once the size of the PARAID 600 has been calculated, the data structures necessary to maintain the state of the device created, and the super block persisted, the PARAID 600 is ready to handle block I/O.

Handling Block I/O

The PARAID level module 606 handles the requests sent to the PARAID 600 from a file system 614. The PARAID level module 606 interprets the request, maps the block to the sector on the appropriate disk according to the striping pattern, and issues the block I/O 616 to read or write the block to or from the disk.

The file system 614 operates in conjunction with the PARAID 600 as though the PARAID were one contiguous block of storage to which it can issue read and write requests. The PARAID level module 606 is illustratively located between the file system and each disk belonging to the array of disks 604. The PARAID level module 606 interprets the read/write requests from the file system 614 and causes the blocks to be put on the disks in the array according to the striping pattern. Thus, this is the point at which the PARAID level module 606 writes the blocks to the disks in a skewed fashion so that the gears within the PARAID 600 can be created.

The formulas in TABLE 2 are illustratively used in the PARAID level module 606 to map the logical sector of the block I/O request sent from the file system 614 to a physical disk belonging to the array of disks 604. The mapping formulas map the logical sector to the physical disk and the sector on that disk device. Formula 1 is used to map the logical sector to the physical disk. Formula 2 is used to map the logical chunk to the logical chunk within a gear. Formula 3 is used to map the logical chunk on the gear to the sector on the disk.

TABLE 2

Skewed striping mapping functions

1. PARAID Logical Chunk to Physical Disk Formula

Figure 8:
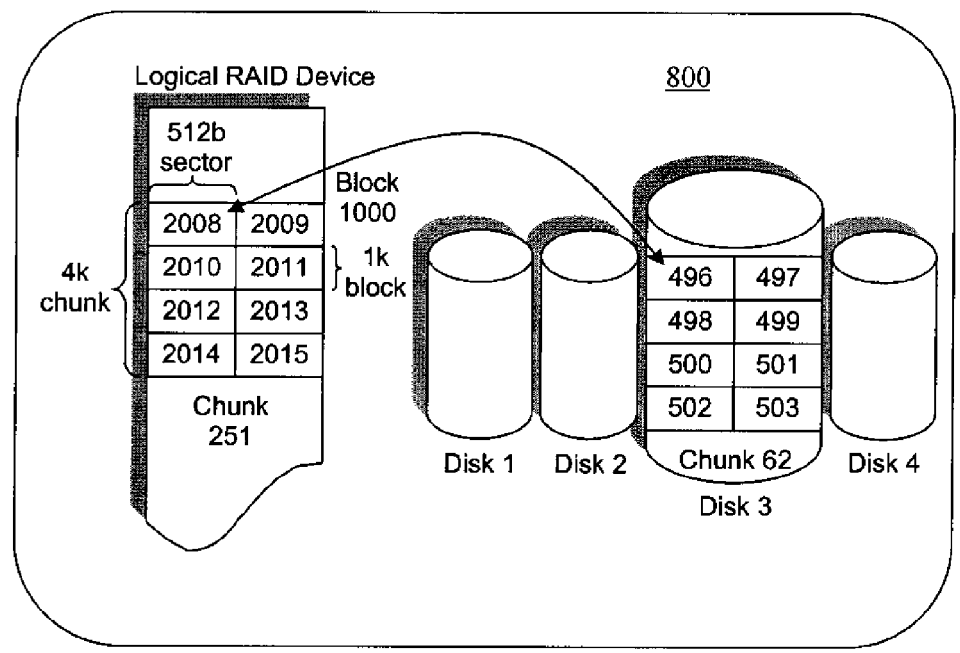
FIG. 8 is a schematic diagram illustrating the operation of a mapping function, according to yet another embodiment of the invention.

Terms s = logical sector number
c = logical chunk number = s/sectors per chunk
g = number of disks in gear
d = physical disk
Formula $d = c \% g$ 2. PARAID Logical Chunk to Logical Chunk on Gear Formula Terms s = logical sector number
c = logical chunk number = s/sectors per chunk
g = number of disks in gear
h = physical chunk in gear, this is also the stripe in gear
Formula $h = c/g$ 3. PARAID Logical Chunk on Gear to Physical Sector Formula Terms s = logical sector number
h = physical chunk in gear, this is also the stripe in gear
n = number of sectors per chunk
f = sector offset within chunk = s % n
r = gear boundary offset on disk
p = physical sector on disk
Formula $p = (h * n) + f + r$ FIG. 8 provides a schematic illustration of the operation of the mapping function. Illustratively, the PARAID comprises four disks and two gears. Gear one has two disks and gear two has four disks. The sector size on the disks is 512 bytes and the block size on the disks is one kilobyte. The chunk size configured for the PARAID is four kilobytes and the second gear is the active gear. Accordingly, there are eight sectors per chunk. Using this information, the logical sector of 2008 is mapped to the appropriate disk and appropriate sector with respect to the disks in the current active gear. The logical sector is used to determine the physical disk within the array of disks using formula one from TABLE 2, above: d=c % g. In this formula c equals 251 because there are eight sectors in a four kilobyte chunk and 2008 divided by eight is 251. Therefore this formula calculates disk three because 3=251% 4.

The logical chunk on the disk, as well as the stripe in the gear, can be computed using formula two from TABLE 2: h=c/g. Again, c equals 251, therefore chunk 62 is calculated as the chunk on the disk because 62=251/4. Now the sector on the disk can be computed using formula three from TABLE 2: p=(h*n)+f+r. Because logical sector 2008 is the first sector in the chunk, f is zero. The factor f represents the offset within the chunk for the sector; the first sector in the chunk has no offset. The factor r is zero because the storage space for gear two on disk three starts at the first sector for data storage. Therefore, sector 496 is calculated as the sector on disk two because 496=(62*8)+0+0.

In some instances, it may be necessary to write some blocks more than once to create the gears used in the PARAID 600. The PARAID level module 606 determines if the block needs to be written more than once by cycling through each disk width for each defined gear and calculating the disk the logical sector should be written to. If the calculated disk for the logical sector is on a disk that is not in the first gear, then the block needs to be written. In this case the PARAID level module 606 issues a block I/O request for the calculated disk and sector.

An example of this focuses on the PARAID 600 illustratively having four disks and two gears. The first gear is made up of two disks, disks zero and one, and the second gear is made up of all four disks. When a write block I/O request is made to the PARAID 600, the PARAID level module 606 uses the logical sector from that block I/O request to calculate the physical disk for the first gear and then does the same for the second gear. When the disk is calculated for the first gear it could be either disk zero or disk one. This will always result in a disk write I/O request. When the disk is calculated for the second gear it could be either disk zero, one, two, or three. If the calculated disk is zero or one then a disk write I/O request is not needed. But if the calculated disk is two or three then a disk write I/O request is needed.

According to this example, if a block I/O is made to the PARAID 600 and the logical sector for this block is 2008, as it was in the previous example, then the calculated disk using formula one from TABLE 2 for the first gear will be disk one, a write block I/O will be issued to disk one. The calculated disk for the second gear using this formula will be disk three. This is a disk that is not included in the first gear and therefore will require a write block I/O to be issued to disk three.

In this example, the reason that a write block I/O does not need to be issued if the calculated disk is a disk within the first gear is that a block I/O will always be issued for the first gear. The block has to be written at least once and it is always written to a disk within the first gear. If a calculated disk for a gear other than the first gear is within the disks that make up the first gear, there is no need to write it again.

When a read block I/O request is made to the PARAID device, the current gear is used to calculate the disk that the sector should be read from using formula one from TABLE 2. This calculation is only done once for reading unless the disk is a disk within the first gear. The disk has to be recalculated if it is a disk within the first gear. If the active gear is gear one, then it will only ever have to be done once. Once the disk has been calculated, the sector on the disk can be calculated using formulas two and three. Then the read block I/O is issued.

According to another example, the PARAID 600 comprises four disks and two gears. The first gear is made up of two disks, specifically, disks zero and one, and the second gear is made up of all four disks. When a read block I/O request is made to the PARAID device, the PARAID level module 606 uses the logical sector from the block I/O request to calculate the physical disk using formula one. If the calculated disk is a disk within the first gear and the current gear is not the first gear then the PARAID level module 606 calculates the disk using the disk width from the first gear. Now that the disk is calculated, the sector on that disk can be calculated and the read block I/O request can be made.

TABLE 3 lists the important information maintained by the PARAID level module 606. Again, the number of disks, gears, and disks in the gears define the PARAID 600. The information so maintained is used to assist in the mapping of the blocks of data from the logical view to the physical disks. The logical chunk and block are obtained with each I/O request made to the device while the disk, chunk, and sector are computed from this information with each request.

TABLE 3

PARAID RAID Personality data
Data kept by PARAID RAID Personality

| Data | Type/Source |
|---|---|
| Number of disks in array | Static/User Defined |
| Number of gears in device | Static/User Defined |
| Number of disks in each gear | Static/User Defined |
| Data offset for each gear for each disk | Static/Computed |
| Chunk size in kilobytes | Static/User Defined |
| Sector size in bytes | Static/Hardware |
| Number of sectors in chunk | Static/User Defined |
| Logical chunk | Dynamic/per I/O request |
| Logical block | Dynamic/per I/O request |
| Disk to read/write | Dynamic/per I/O request |
| Sector on the disk to read/write | Dynamic/per I/O request |
| Sector offset in chunk | Dynamic/per I/O request |
| Active gear | Dynamic/Computed |

Gear Shifting

The PARAID gear-shifting logic module 608 provides the functional operations that cause gear shifting in the PARAID 600. The operations include power cycling the disks and disk synchronization.

Power Cycling

The PARAID gear-shifting logic module 608 controls the disks in the PARAID 600. Part of this control entails performing a gear shift between gears. The PARAID gear-shifting logic module 608 does not actually determine when the gears should be shifted, that determination is made by the PARAID monitoring module 610, discussed more particularly below. Nevertheless, when a gear shift is required, the PARAID gear-shifting logic module 608 executes the gear shift.

Shifting between gears in the PARAID 600, the PARAID gear-shifting logic module 608 determines the current gear as well as to which gear to shift. Based on this information, the PARAID gear-shifting logic module 608 efficiently and effectively causes a shift between the gears. The PARAID gear-shifting module 608 determines the set of disks that need to be powered off, going from a higher gear to a lower gear, or, alternatively, the set of disks that need to be powered on, thus going from a lower gear to a higher gear.

If disks need to be powered on, then the disks are synchronized. Once the set of disks have been powered on and have been synchronized, the current gear is changed to the new gear setting, effectively shifting from a lower to higher gear. If disks need to be powered off, then the current gear is changed immediately to the new gear setting, and then the disks are powered off, effectively shifting from a higher gear to a lower gear.

Disk Synchronization

When disks are in a powered-off state, no read and write block I/O requests are sent to those disks. When a powered-off disk misses a write block I/O request that it should have received, the disk goes out of sync and is no longer in a current state. A powered-off disk that is to be used in an active gear must be synchronized with the current data before handling read I/O requests. A disk can be brought back into an active state by either synchronizing all stale data before bringing the disk back into an active gear, or by synchronizing the stale data only when it is demanded. Full synchronization requires that all stale data be updated with current data. Depending on the number of missed write requests, this process could take a significant amount of time. The on-demand approach only updates the stale data when an I/O request is made to read that data. The on-demand approach allows the gear shift to take place much more quickly but the full synchronization approach guarantees that the entire disk is current.

The write block I/O request that was previously missed by a powered-off disk is first captured in order to synchronize a disk. The capture of these missed write block I/O requests is handled by the PARAID gear-shifting logic module 608. In the case of full synchronization, if a disk is brought from a powered-off to a powered-on state because of a gear shift, then the PARAID gear-shifting logic module 608 cycles through the list of captured write block I/O requests and reissues them to the disk that is to be synchronized. In the case of on-demand synchronization, the PARAID level module 606 references the list of dirty blocks for that disk. If the block being read is dirty, the PARAID 600 first retrieves the current block from the first gear and returns it to the requestor. The PARAID 600 will then write that block to the disk or disks on which the block is stored as stale data, thereby effectively synchronizing the disks on-demand.

All that is needed to capture the write block I/O requests is the disk that was written to within the first gear, the sector number on that disk, and the sector that should be written to on the disk that is being synchronized. The PARAID gear-shifting logic module 608 then reads the sector from the disk within the first gear and writes that sector to the disk that is being synchronized. In the case of full synchronization, once all of the captured write block I/O requests have been issued to the disk being synchronized, the disk is back in a current state, and thus it can be brought back into an active gear.

The disk being synchronized could not be brought into an active gear if a disk were to fail, which would inhibit completion of the synchronization process. This would eventually halt the gear shifting process and inhibit the gears from shifting. Once the PARAID 600 has recovered from the disk failure and the PARAID gear-shifting logic module has been requested to perform the same gear shift, the disk synchronization would start again. Blocks that had been successfully synchronized before the disk failure would not need to be synchronized again as long as there were no additional updates to those blocks after the disk failure. The list of blocks that need to be synchronized would continue to be maintained through out the disk failure and recovery process. If a block that had been synchronized before the gear shift were subsequently dirtied, then the list would reflect this, and the block would be updated accordingly during the next synchronization process.

Whether to use on-demand or full synchronization is configurable. On-demand synchronization will allow the PARAID 600 to quickly adjust to frequently changing workload. This also means that additional write activity will be introduced while the disks are out of synch. The full-synchronization approach may be preferable if there are few gear shifts and the workload has little write activity, effectively keeping the number of blocks to be synchronized small. The full synchronization method is also available for manual maintenance of the PARAID 600. There are a number of reasons why the administrator would need to have a powered-down disk that has stale data on it to be brought back into a current state.

TABLE 4 lists the important information kept by the PARAID gear-shifting logic module 608. Most important is the lists of dirty blocks for the powered off disks. This information is used by the PARAID gear-shifting logic module 608 to synchronize disks that are to be brought back into an active gear.

TABLE 4

PARAID gear-shifting logic Data
Data kept by PARAID Disk Manager

| Data | Type/Source |
| --- | --- |
| Disk state for each disk in array | Dynamic/Checked |
| Dirty blocks on each disk | Dynamic/Checked |

Saving Energy

The PARAID monitoring module 610 determines when the gears in the PARAID 600 should be shifted to meet the current demand on the system. The PARAID monitoring module 610 has the capacity to make the determination because it monitors the workload placed on the PARAID 600. Based on the workload, the PARAID monitoring module 610 issues requests to the PARAID gear-shifting logic module 608 to change to a higher or lower gear.

Gear Shift Up

To determine whether or not the PARAID 600 should shift into a higher gear, the PARAID monitoring module 610, must know the demand placed on the PARAID device and how busy a gear should be before switching to a higher gear. The gear utilization threshold is the metric used to determine when to perform a gear shift. This metric is compared to the actual disk utilization for the disks in the gear. The disk utilization is determined by intermittently checking, typically once a second or so, disk activity in the form of a read or write I/O request. A system administrator can set the gear utilization threshold, which indicates the degree to which a gear should be utilized before switching to a higher gear. The utilization threshold can be set by the system administrator via a configuration file or by using a PARAID user administration tool, described below. For example, the administrator might want the threshold to be set at 80%. When the PARAID 600 for the current gear is utilized more than 80%, the PARAID monitoring module 610 switches into a higher gear.

In order to determine the demand placed on the PARAID 600, and thus effectively on the system, the PARAID monitoring module 610 keeps a moving average of utilization over the past 60 seconds for each disk. Intermittently, such as once a second, each disk is checked to determine whether any read or write activity has occurred on that disk. If any such activity has in fact occurred, the disk is marked as active for that second. TABLE 5 lists the formula used to calculate the moving average.

TABLE 5

Moving average formula
PARAID Monitor Disk Moving Average Formula

Terms t = time interval for moving average in seconds
u = number of seconds disk utilized over time interval t
r = moving average
Formula r = u/t If the moving average is above the threshold for all disks in the active gear then the PARAID monitoring module 610 issues a request to the PARAID gear-shifting logic module 608 to switch to the next higher gear. FIG. 9 provides a plot of load-versus-time illustrating a gear shift from a low gear of two disks to a high gear of four disks because the moving utilization average rose above the threshold.

Gear shifting to a higher gear can be intentionally aggressive in order that the PARAID device can respond rapidly to a sharp increase in workload. As soon as the moving average reflects a gear utilization that is higher than the gear utilization threshold, a gear shift is performed regardless of when the last upward gear shift took place. Within approximately one minute, two upward gear shifts could take place if the workload demanded it. FIG. 10 provides a plot of load-versus-time illustrating the PARAID 600 response to sharp increases in a fluctuating workload by performing multiple upward gear shifts in a short period of time.

Gear Shift Down

In order to determine whether or not the PARAID 600 should gear shift into a lower gear, the PARAID monitoring module 610 must be aware of the demand placed on the PARAID, as with upward gear shifts, as well as operational trends. Downshifting of gears in the PARAID 600 should be done more conservatively such that spikes and drops in system activity do not place the PARAID 600 in a gear that is incapable of handling the requests. The problem can be prevented by determining several moving averages over different time intervals and comparing them so that general utilization trends can be determined. As with upward gear shifting, the degree to which a gear is utilized should be known before switching to a lower gear.

A primary determination made by the PARAID monitoring module 610 before shifting into a lower gear is whether the lower gear can handle the downward sloping trend in utilization. Note that it typically is not sufficient that the PARAID monitoring module 610 determine that there is a downward sloping trend in utilization; it must also determine that the next lower gear can handle the workload. The first check that is performed, though, is to identify a significant downward sloping trend in activity.

The PARAID monitoring module 610 keeps three moving averages at three different time intervals, 10 seconds, 60 seconds, and 300 seconds, so as to be able to identify a downward sloping trend. The moving averages for each time interval are computed from the formula in TABLE 7. The 10 second and the 60 second moving utilization averages are compared, and if the 10 second moving utilization average is less then the 60 second moving utilization average, then the 60 second and the 300 second moving utilization averages are compared. If the 60 second moving utilization average is lower than the 300 second moving utilization average, the trend is deemed a significant downward sloping trend in workload. Having identified a significant downward sloping trend, the PARAID monitoring module 610 determines whether the next lower gear can handle the current workload. If the next lower gear can handle the current workload, then the PARAID monitoring module 610 issues a request to the PARAID gear-shifting logic module 608 to switch to the next lower gear.

Figure 11:
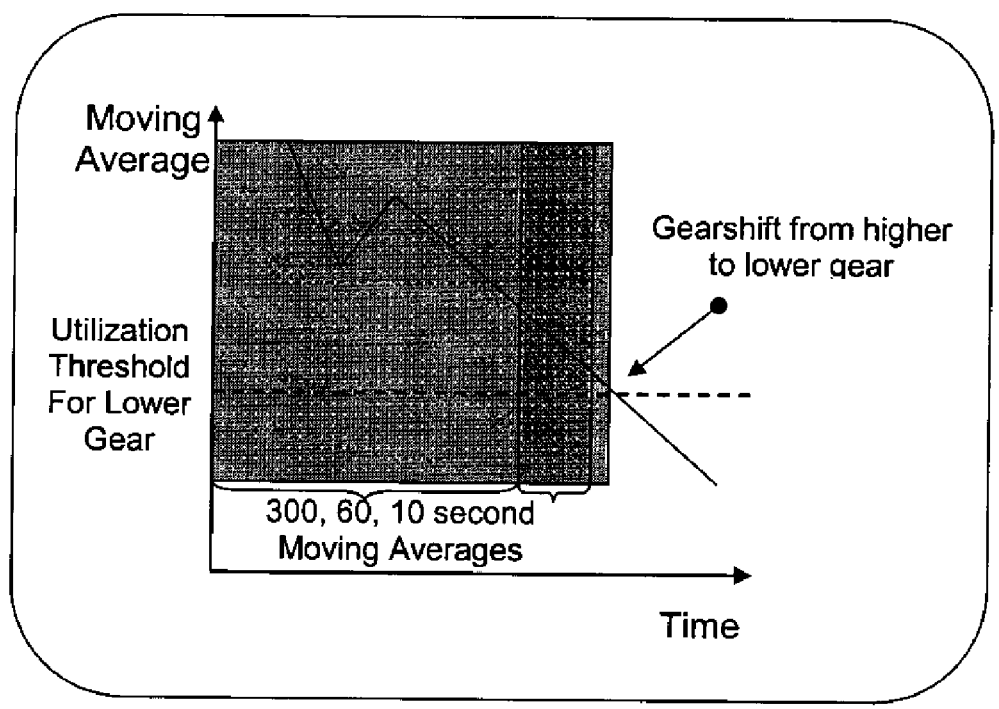
FIG. 11 is a moving average-versus-time plot illustrative of a significant downward sloping trend.

FIG. 11 provides a moving average-versus-time plot illustrative of a significant downward sloping trend. As illustrated, when significant downward trends in workload cross the utilization threshold of the nest lower gear, the PARAID monitoring module 610 performs a downshift in gears. Note that a conservative approach to downshifting tolerates spikes in workload under the threshold for the lower gear showing that the trends over the 300, 60, and 10 moving averages will determine when the next downshift will take place and not just whether a sudden drop in workload has occurred.

TABLE 6 lists the important information kept by the PARAID monitoring module 610, must maintain the thresholds for each gear. The moving averages are continually computed by the PARAID monitoring module 610 and are checked against the thresholds for potential gear shift opportunities.

TABLE 6

PARAID Monitor data
Data kept by PARAID Monitor

| Data | Type/Source |
|---|---|
| Monitor upper threshold per gear | Dynamic/User Defined |
| Monitor lower threshold per gear | Dynamic/User Defined |
| Monitor interval between ear shifts | Dynamic/User Defined |
| Monitor status | Dynamic/Checked |
| Monitor current time | Dynamic/Computed |
| Monitor moving average | Dynamic/Computed |
| Monitor 10 second moving average | Dynamic/Computed |
| Monitor 30 second moving average | Dynamic/Computed |
| Monitor 300 second moving average | Dynamic/Computed |

Managing Reliability

The PARAID reliability module 612 manages attributes related to a life expectancy of each disk and the recovery of PARAID 600 in the event of disk failure. Through managing the life expectancy of the disk and recovering from disk failure, the PARAID reliability module 612 is enforces a level of reliability. This reliability can match that of a conventional RAID.

Managing Life Expectancy

As will be readily appreciated by one of ordinary skill in the art, disks can not be power cycled an unlimited number of times. The disks of a PARAID could have a rating of 20,000, the rating being the number of times that an individual disk belonging to the array can be power cycled. Therefore, it is important to manage the number of power cycles for a disk so that disk failure from power cycling can be predicted and mitigated.

In order to accomplish the task, the PARAID reliability module 612 enforces a power cycle rationing scheme over the disks. In order to ration the number of times a disk is power cycled the PARAID reliability module 612 needs to know the expected number of power cycles for a given disk, the time interval to enforce the rationing, and the desired life expectancy for the disks. This information can be provided by a system administrator through a configuration file or a PARAID user administration tool provided below.

The formula listed in TABLE 7 determines the number of times a disk can be rationed given the rationing interval, desired life expectancy, and the total number of power cycles.

TABLE 7

Power cycle rationing formula
Power Cycle Rationing Formula

Terms p = number of power cycles for the disk
i = number of rationing interval(s) per year
l= life expectancy in year(s)
r = number of power cycles per rationing interval
Formula r = p/(i * 1)

For example using the Power Cycle Rationing Formula, a disk that can be power cycled 20,000 before failure using a rationing scheme that is enforced on a weekly basis with the five year minimum guaranteed life expectancy of the disks can be power cycled 76 times a week, 76=20,000/(52*5).

When the PARAID gear-shifting logic module 608 is requested to gear shift the PARAID 600, the disk managing module checks with the PARAID reliability module 612 to determine whether the power cycle is allowed according to the configured rationing scheme. If it is not allowed, then the PARAID gear-shifting logic module 608 requests the PARAID reliability module 612 to indicate the gear that the PARAID 600 should operate in when the number of rationed power cycles has been met for that interval. The PARAID gear-shifting logic module 608 shifts to that gear if it is not already in that gear. Typically, the gear that the PARAID 600 should operate in when the rationed number of power cycles has been met for an interval can be set by the system administrator.

When the number of power cycles left on a disk in the array reach or is near a predetermined threshold, the PARAID reliability module 612 exchanges the disk with another the array able to undergo more power cycles. Once a candidate has been determined with which to switch roles with disk at or near the threshold, the PARAID reliability module 612 executes the role exchange by swapping the data contents between the two disks. When the process has been completed, the disks can be brought into the appropriate gears within the PARAID 600. By exchanging the roles of the disks within the array, the number of power cycles can be evenly distributed across the disks. The described process can extend the life expectancy of the device significantly.

Recovery from Disk Failure

One of the benefits of using a skewed striping pattern is the expanded ability for the PARAID 600 to recover from disk failure. A disk that fails that is not within the first gear can be fully recovered. All of the data blocks that are persisted to the PARAID 600 are stored on the disks within the first gear. All of the other disks that are not included in the first gear only store a subset of those disks.

If a disk that is outside of the first gear were to fail, the PARAID reliability module 612 would notify the system administrator through any number of avenues of communication. For example, a log file, a real time status output, or even an alert email message could be used to notify the system administrator. Once the failed disk has been replaced, the PARAID reliability module 612 instructs the PARAID gear-shifting logic module 608 which data blocks to synchronize from the first gear to the new disk. No additional information need be kept; all needed information can be calculated using the formulas defined for the PARAID level module 606 for handling block I/O requests.

The PARAID reliability module 612 cycles through the persisted sectors within the first gear and calculates the original logical sector. Using the logical sector, the PARAID reliability module 612 determines whether this sector needs to be written to the newly added disk for any of the gears other than the first gear. If it does need to be copied, then the PARAID reliability module 612 requests that the PARAID gear-shifting logic module 608 copy the sector from the first gear to the appropriate sector onto the newly added disk.

If a disk were to fail that was in the first gear and the data blocks on those disks were not replicated anywhere then the PARAID 600 would fail. The invention provides solutions to prevent this from happening, however. For example, the PARAID 600 can utilize spare disks to mirror the data blocks that are stored on the disks in the first gear. The available storage on the disks that are not in the first gear also could be used to mirror the data blocks stored on the first gear. Additionally, bit parity information could be used in the first gear like that of RAID level 5. This would allow the first gear to tolerate a single disk failure.

The time needed for a disk to recover is a function of how much data needs to be written to the new disk. If the disk that fails is in a high gear at the end of the array, then the data to write from the first gear to the new disk will be less than if the disk were in a low gear closer to the first gear. This is due to the manner in which blocks are contained on the disks according to the skewed striping pattern.

For example, if the PARAID 600 comprises six disks of 30 gigabytes each and three gears of two, four, and six disks respectfully, the amount of time for disk recovery can be determined by calculating the amount of data that would need to be read from gear one and written to the new disk. The calculated capacity for this device using the PARAID capacity algorithm would be 60 gigabytes. The storage requirements for disks three and four are the storage requirements on those disks for gears two and three. Gear two requires 15 gigabytes of storage on disks three and four and gear three requires 10 gigabytes of storage on disks three and four. This means that there is a maximum of 25 gigabytes of storage space that would have to be synchronized if either disk three or four failed. The storage requirements for disks five and six are just what gear three uses on those disks because it is the only gear that uses those disks. Gear three requires 10 gigabytes of storage on disks five and six.

TABLE 8 lists important information maintained by the PARAID reliability module 612. Perhaps most important pertains to is information that pertains to the life expectancy and the rationing time interval. From this information the PARAID reliability module 612 can calculate the rationed power cycles per rationing interval for each disk and determine the best disk to role exchange when needed.

TABLE 8

PARAID Reliability data
Data kept by PARAID Controller

| Data | Type/Source |
|---|---|
| Rated power cycles of each disk | Static/Checked |
| Remaining power cycles for each disk | Dynamic/Computed |
| Rationed power cycles per disk | Dynamic/Computed |
| Rationing time interval | Dynamic/User Defined |
| Life Expectancy | Dynamic/User Defined |
| Default operating gear | Dynamic/User Defined |

User Administration

The PARAID user administration tool, designated herein as PDADM for PARAID administration, is responsible for providing the conduit from the system administrator to the PARAID device. This user administration tool provides, for example, knobs and buttons that allow the administrator to adjust or otherwise tweak the PARAID device for enhanced or optimal performance.

Controls

The knobs and buttons provided to the PARAID administrator can be categorized by each component. TABLE 9 shows the entire set of controls, categorized component, that are available to the system administrator.

TABLE 9

PARAID User Administration controls
PARAID User Administration Control

| PARAID Disk Manager | |
|---|---|
| Gear Shift Button | Manually shift gears |
| Synchronize Button | Manually synchronize the disks |
| PARAID Monitor | |
| Time Interval Knob | Adjust the mandatory time between gear shifts |
| Gear Threshold Knob | Adjust the upper and lower utilization thresholds for each gears. |
| On/Off Button | Turn the monitor on or off |
| PARAID Controller | |
| Rationing Interval Knob | Adjust the time interval that rationing is enforced |
| Disk Life Expectancy Knob | Adjust the life expectancy for the disks |
| Power Cycles/Disks Knob | Adjust the number of power cycles for a disk |
| Default Operating Gear Knob | Set the operating gear when the PARAID device has used its rationed amount of power cycles for an rationing interval |

For the PARAID gear-shifting logic module 608, the PDADM allows the PARAID administrator to request a gear shift. The administrator can shift into any gear that the PARAID 600 has. Of course, this is to be used with caution because changing into the wrong gear at the wrong time could negatively impact the performance of the storage device. If the PARAID 600 were to be switched from a high gear to a low gear while the system was experience peak load, the device would not be able to serve the data fast enough ultimately overloading the system. The user administration tool will notify the administrator if the requested gear does not have the throughput to handle the current load so that this can be prevented.

The user administration tool also allows the administrator to request that a disk be synchronized. If the administrator wants to have all disks brought back into a current state because they have been powered off for a very long time, the administrator can do this through this user administration tool. The PARAID monitoring module 610 powers off the disks after being synced if there is no other activity on them after the synchronization.

For the PARAID monitoring module 610, the PDADM allows the PARAID administrator to change the time interval that is enforced between gear shifts. The administrator might want to have the system react more quickly to upward utilization trends. Tweaking this value will allow the administrator to find the optimal value. This tool also allows the administrator to set the upper and lower utilization thresholds for each gear. By having a higher upper threshold, more power can be saved because fewer disks will be used. By having a lower upper threshold, the PARAID 600 might perform better, having more disks powered on longer. By having a higher lower threshold, the PARAID 600 will react more quickly to downward sloping trends and shift into lower gears more quickly. While having a lower threshold, the PARAID 600 will wait longer to shift into lower gears, taking a very significant downward utilization trend to switch into a lower gear. Lastly, this tool allows the administrator to turn the monitor on and off. It might be the case that the administrator does not want the PARAID monitoring module 610 to run at all and the administrator will shift the gears manually.

For the PARAID reliability module 612, the PDADM allows the PARAID administrator to set the rationing interval, the minimum guaranteed life expectancy for a disk, the number of power cycles for a disk, and the gear to operate in when the rationing for an interval has been met. The administrator has the ability to tweak the performance versus power savings for a PARAID 600 though these knobs for the PARAID reliability module 612. Saving power is done at the expense of disk life expectancy. If the load on the system fluctuates frequently and the desired goal is to maximize power savings, then the expected life of the disks would decrease. If the goal is to maximize the minimum expected life, then the number of times a disk can be power cycled per interval will be reduced, potentially missing out on opportunities to save power.

The administrator can set the rationing of power cycles to be weighted seasonally. For example, if more workload on average is experienced in the winter season, the administrator can set this season to be weighted more heavily than the other seasons. This would increase the number of rationed power cycles for the rationing intervals over that season and lower the number of rationed power cycles for the other seasons.

If the rationed number of power cycles is not used within a rationing interval for a particular disk, the remaining power cycles can be rolled over into the next rationing interval. Conceivably, by the end of the expected life, the disks could have many power cycles remaining. As time goes by over the lifetime of the disks, the remaining power cycles that have been continually rolled over into the next rationing interval could be averaged and a projected life expectancy could be provided to the administrator. Using this information, the administrator can decide to keep the current power saving policy configured for the device and enjoy the extended life of the disks or set a more aggressive power saving policy and enjoy more power savings.

The invention, as noted throughout the description, can be realized in hardware, software, or a combination of hardware and software. The invention also can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embodied in a computer program product, which comprises all the features enabling the implementation of the methods described herein, and which when loaded in a computer system is able to carry out these methods. Computer program in the present context means any expression, in any language, code or notation of a set of instructions intended to cause a system having an information processing capability to perform a particular function either directly or after either or both of the following: a) conversion to another language, code or notation; and b) reproduction in a different material form.

This invention can be embodied in other forms without departing from the spirit or essential attributes thereof. Accordingly, reference should be made to the following claims, rather than to the foregoing specification, as indicating the scope of the invention.

I claim:

1. A system defining a power-aware redundant array of identical disks (PARAID), the system comprising
    a plurality of disks, each disk storing at least one of a plurality of data blocks, wherein the data blocks are allocated among the plurality of disks in a skewed striping pattern, said skewed striping pattern comprising replicating a portion of said plurality of data blocks to provide different predetermined sets of disks, wherein each of said different sets of disks provides access to said plurality of data blocks using a different number of disks, wherein said different predetermined sets of disks define a series of gears within said plurality of disks, each gear in the series of gears having a progressively higher capacity; and
    a PARAID disk manager for selectively powering on one or more combinations of the plurality of disks to transition between the series of gears according to an order of the series of gears, wherein the combinations are based upon system-user demand usage.

2. The system as defined in claim 1, wherein the plurality of disks corresponding to different sets of disks operate in different modes of operation.

3. The system as defined in claim 2, wherein each of the different modes of operation corresponds to unique gears in the series of gears, and wherein the PARAID disk manager selectively causes the PARAID to operate in one of the unique gears based upon user demand.

4. The system as defined in claim 3, wherein the one of the unique gears is selected so as to optimize a trade-off between power consumption by the PARAID and a performance level of the PARAID.

5. The system of claim 1, wherein each of the different predetermined sets of disks provides access to a uniform striping pattern of said plurality of disks.

6. The system of claim 1, wherein the PARAID manager is further configured during said selectively powering for iteratively performing the acts of:
    determining a disk utilization for one of the series of gears currently powered;
    powering on a lower one of the series of gears with respect to the one of the gears currently powered responsive to the utilization indicating under utilization; and powering on a higher one of the series of gears with respect to the one of the gears currently powered responsive to the utilization indicating over utilization.

7. A power-aware redundant array of independent disks (PARAID) disk driver, the PARAID disk driver comprising:
a controller adapted for instantiating a PARAID to operate within a computing environment by segmenting data among the array of independent disks in a skewed striping pattern, the skewed striping pattern replicating a portion of the data to create multiple distinct sets of the array of independent disks, each set comprising a different number of the independent disks, wherein said multiple distinct sets define a series of gears within said array of independent disks, each gear in the series of gears having progressively higher capacity in which the PARAID operate;
wherein the controller selectively causes the PARAID to operate in a particular gear by transitioning between the series of gears according to an order of the series of gears; and
wherein the controller determines in which gear the PARAID operates.

8. The PARAID disk driver as defined in claim 7, wherein the controller manages a life expectancy of each disk device belonging to the array of independent disks.

9. The PARAID disk driver as defined in claim 8, wherein the controller handles discrete disk device failures.

10. The PARAID disk driver as defined in claim 7, wherein the controller provides a system administrator a mechanism for adjusting the PARAID.

11. A method of instantiating and operating a power-aware redundant array of identical disks (PARAID), the method comprising:
storing a plurality of data blocks in a skewed striping pattern on various disks belonging to the array of identical disks, said skewed striping pattern comprising replicating a portion of said plurality of data blocks to provide different predetermined combinations of disks, wherein each of said different combinations of disks provides access to said plurality of data blocks using a different number of disks, wherein said different predetermined sets of disks define a series of gears within said plurality of disks, each gear in the series of gears having a progressively higher capacity; and
selectively powering on one or more of said combinations of disks to transition between the series of gears according to an order of the series of gears, wherein the combinations are based upon user demand.

12. The method of claim 11, further comprising operating the plurality of disks in different modes of operation, each of the different mode of operation corresponding to unique gears in the series of gears.

13. The method of claim 12, further comprising causing the PARAID to operate in one of the unique gears based upon user demand.

14. The method of claim 13, further comprising selecting the one of the unique gears so as to optimize a trade-off between power consumption by the PARAID and a performance level of the PARAID.

15. A computer-readable storage medium, the storage medium comprising computer instructions for:
storing a plurality of data blocks in a skewed striping pattern on various disks belonging to the array of identical disks, said skewed striping pattern comprising replicating a portion of said plurality of data blocks to provide different predetermined combinations of disks, wherein each of said different combinations of disks provides access to said plurality of data blocks using a different number of disks, wherein said different predetermined sets of disks define a series of gears within said plurality of disks, each gear in the series of gears having a progressively higher capacity; and
selectively powering on one or more of said combinations of disks to transition between the series of gears according to an order of the series of gears, wherein the combinations are based upon user demand.

16. The computer-readable storage medium of claim 15, further comprising computer instructions for operating the plurality of disks in different modes of operation, each mode of operation corresponding to unique gears in the series of gears.

17. The computer-readable storage medium of claim 16, further comprising computer instructions for causing the PARAID to operate in one of the unique gears based upon user demand.

18. The computer-readable storage medium of claim 17, further comprising computer instructions for selecting the one of the unique gears so as to optimize a trade-off between power consumption by the PARAID and a performance level of the PARAID.

* * * * *